March 29, 1966 N. J. KEEN 3,243,255
PROCESS FOR THE REACTION OF SOLIDS WITH LIQUIDS
Filed Feb. 19, 1963 2 Sheets-Sheet 1
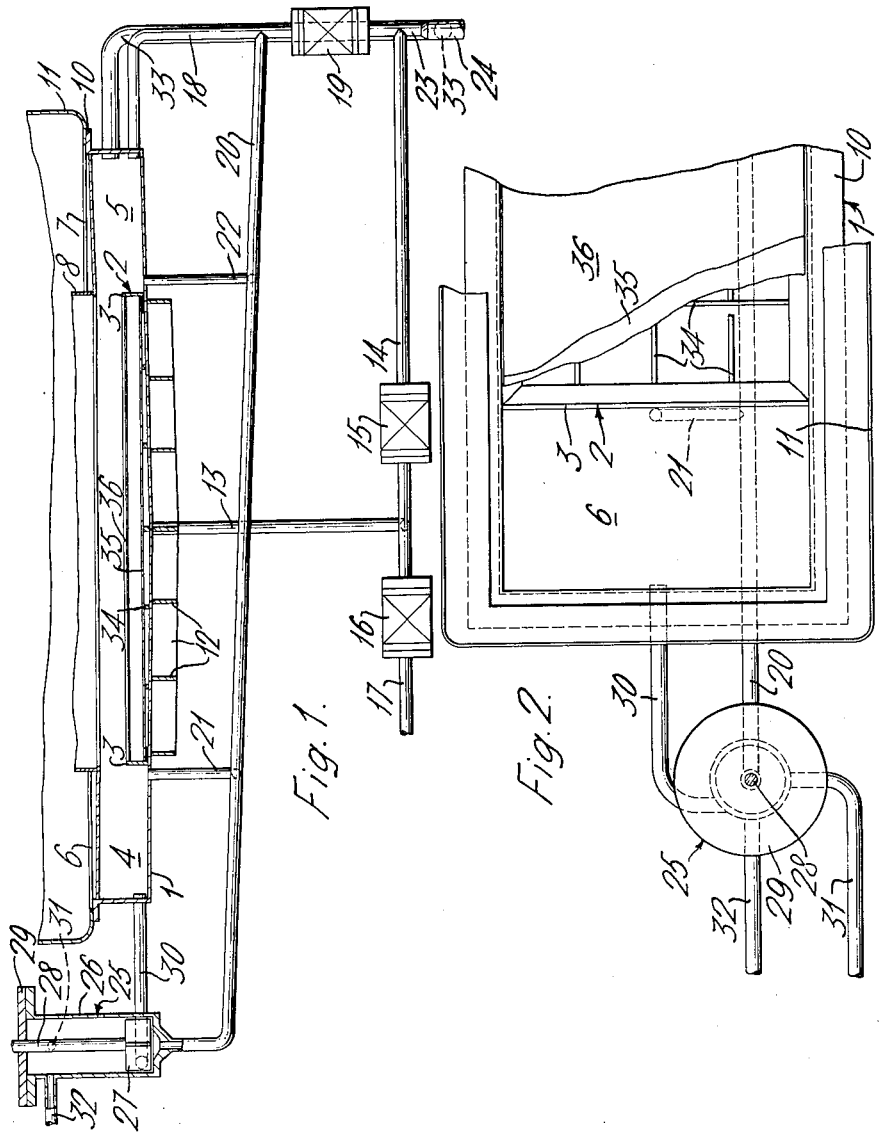

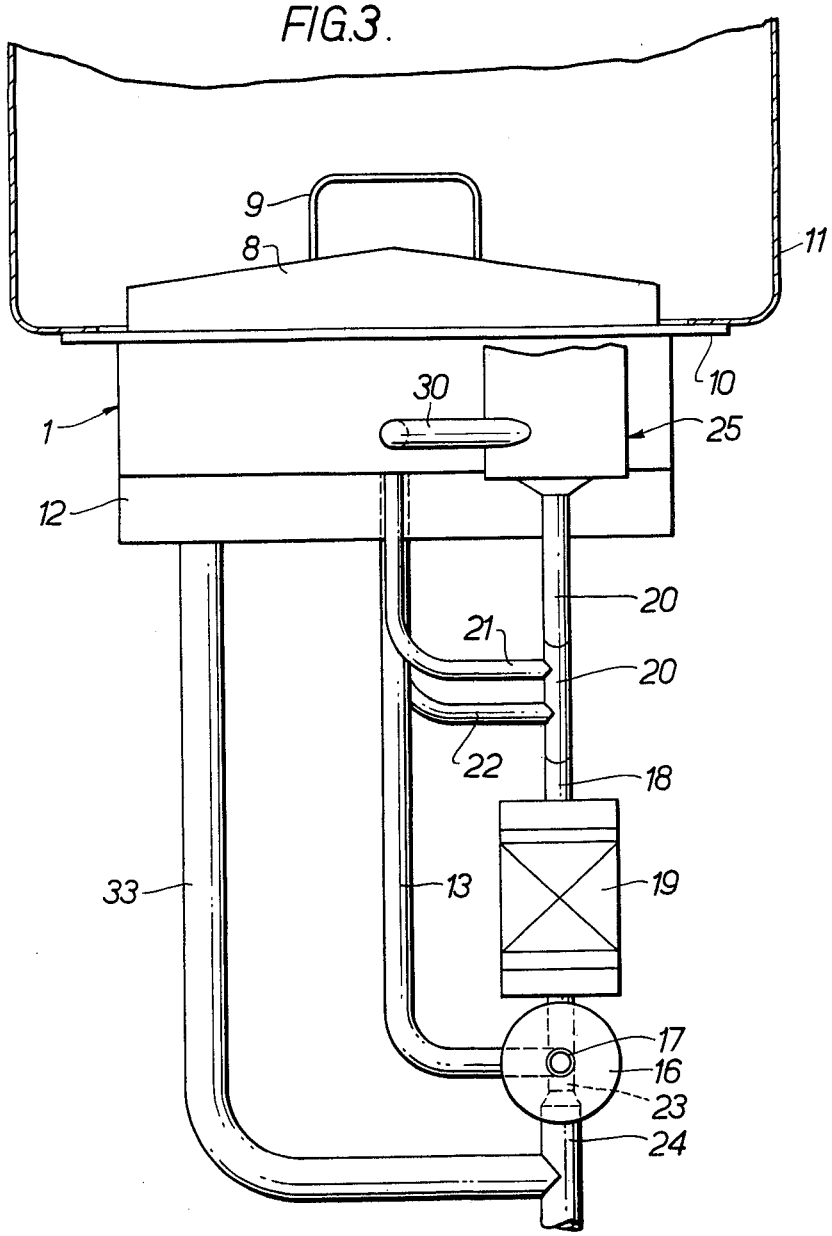

3,243,255
PROCESS FOR THE REACTION OF
SOLIDS WITH LIQUIDS
Norman James Keen, Wantage, England, assignor to United Kingdom Atomic Energy Authority, London, England
Filed Feb. 19, 1963, Ser. No. 259,498
Claims priority, application Great Britain, Mar. 8, 1962, 9,045
7 Claims. (Cl. 23—14.5)

The present invention relates to a process and apparatus for the reaction of solids with liquids.

When it is required to react, e.g. dissolve, highly reactive materials, frequently using a highly reactive liquid reagent, problems are frequently incurred in the excessive violence of the reaction and it is the object of the present invention to provide a method and apparatus for carrying out such a reaction. It should be mentioned that the present invention is particularly designed to enable zirconium-uranium alloy to be dissolved, use being made of a mixture of hydrofluoric acid and hydrogen peroxide as the dissolving agent. This reaction is very violent and if not conducted with care will result in fuming and splashing of the reagent, whilst the alloy may be heated even as far as incandescence. It will, of course, be understood that such use of the method and apparatus in this particular connection is given purely by way of example and the invention can, of course, be applied to other reaction, e.g. dissolution, problems.

According to the present invention there is provided a method for the reaction of solids with a liquid reagent comprising flooding the solid with weak reagent and maintaining a circulation of such reagent over the solid, strong reagent being added to the circuit externally of the reaction vessel.

Desirably the solid will be completley covered by the reagent at all times.

According to a further aspect of the present invention there is provided apparatus for reacting a solid with a liquid comprising a reaction vessel designed to contain the solid, together with a circulating pump and pipe system adapted to maintain a level of reagent liquid in the reaction vessel sufficient at least partially to immerse solid therein, together with means in said circuit but externally of the reaction vessel for adding strong reagent to the liquid therein.

Thus it will be seen that in the method of the present invention the highly reactive solid is at least partially covered with weak reagent and problems of spitting are minimised by the initial slow reaction due to the weak reagent. The reagent is kept circulating and strong reagent is added to the circuit externally of the reaction vessel at such a rate that the reaction is kept under control. The weak reagent may be inert diluent, diluted reagent or spent reagent, its strength in any event being such that no violent reaction takes place. The strong reagent is conveniently concentrated reagent but may be fresh, i.e. unspent, reagent, in either case being so strong that a violent reaction would take place. The strong reagent may conveniently be added in a pump which is used in effecting circulation of the reagent.

In order that the present invention may more readily be understood, one embodiment of the same will now be described with reference to the accompanying drawings, where:

FIGURE 1 is a side elevation with parts in section;
FIGURE 2 is a plan view with parts broken away, and
FIGURE 3 is an end elevation with parts in section.

In the drawings no attempt has been made to show the lines on which the sections are taken as these lines vary and have been chosen to provide a clearer understanding of the apparatus.

Referring now to the drawings, the apparatus comprises a reaction vessel in the form of a trough 1, this trough having, located between its ends, an inner trough 2 defined by upstanding end walls 3, these end walls being perforated to permit the flow of reagent. The location of the inner trough 2 defines inlet and outlet distribution boxes 4 and 5 respectively, these distribution boxes being covered by sloping plates 6 and 7 respectively, which extend from the ends of the trough 1 as far as the end walls 3 of the inner trough 2. The inner edges of the plates 6 and 7 serve to support a splash guard 8 which is provided with a handle 9 to enable it to be lifted, this splash guard not being shown in FIGURE 2.

The upper edge of the side walls of the trough 1 is provided with an out-turned flange 10 to which is secured a main cover 11, which forms a glove box and may conveniently be connected to fume extraction apparatus in the known manner.

The underside of the centre portion of the trough 1, i.e. that portion generally below the inner trough 2, is reinforced by cross webs 12 and, as can be seen from FIGURE 1, the bottom surface of the trough slopes slightly downwardly to its centre line. A conduit 13 leads from the centre portion of the main trough 1 and is connected to a delivery conduit 14, being isolated by valves 15 and 16. During dissolution the valves 15 and 16 are both kept closed. However, the solid to be dissolved is usually loaded into the apparatus under a layer of kerosene and when desired the valve 16 may be opened so as to connect the conduit 13 to a conduit 17 which is connected to a receiver (not shown) to permit the kerosene to be run off.

An off-take pipe 18 leads from the outlet distribution box 5 and passes to a valve 19. A circulation pipe 20 branches from the pipe 18 and passes underneath the trough 1 to the other end of the apparatus, branch pipes 21 and 22, of comparatively small bore, which connect the lower parts of the distribution boxes 4 and 5 to the pipe 20 serving to permit draining of these parts of the apparatus. The pipe 20 is sloped to prevent gas blocks. A main outlet pipe 23 leads from the valve 19 and below this there is a junction with the delivery conduit 14 and thereafter the pipe 23 merges into a section 24 of larger bore. In use the valve 19 is normally kept closed.

A centrifugal circulating pump 25 is provided and includes a body portion 26 and a four bladed rotor 27 driven by a shaft 28 which passes through a cover plate 29. The pipe 20, which forms an inlet pipe for the pump 25 passes vertically upwards through the base of the pump. An outlet conduit 30 for the pump is provided adjacent to the base and leaves the pump in a generally tangential direction (see FIGURE 2) and this outlet conduit passes through the end wall of the trough 1 and into the distribution box 4. The pump 25 is also provided, adjacent its upper part, with a gas vent pipe 31 and with an inlet pipe 32 for the supply of the strong reagent Finally an overflow conduit 33, of relatively large bore, is connected to the distribution box 5 at a level above the tops of the walls 3 and is connected to the large bore portion 24 of the main delivery pipe below the junction with delivery conduit 14. This overflow conduit is designed for protection in cases where the volume of liquid is limited by criticality conditions.

The inner through 2 is provided with cross webs 34 defining a level bed upon which rests a perforated tray 35 covered by a cloth (not shown) to support the material which is being dissolved and this material is covered by a perforated lid 36 which is located below the upper edge of the walls 3 and which may be supported in any suitable manner (not shown).

In order to use the apparatus, the valves 15, 16 and 19 are closed and no reagent liquid is present in the apparatus. The solid to be dissolved (covered in kerosene) is placed in the tray 35 and covered by the lid 36 whereafter the splash guard 8 is replaced. The valve 16 is then opened to drain off the kerosene to the receiver via the conduits 13 and 17 and is then closed again. Weak reagent is then supplied via the inlet pipe 32 so as to fill the apparatus including the pipes 18, 20, 21 and 22 up to the required level. It must be emphasized that this weak reagent is so weak that no violent reaction can take place and may indeed, under suitable circumstances, be merely water or other inert diluent. The pump 25 is set into action by rotating the shaft 28 so as to cause a continual flow of reagent liquid over the reactant solid, into the distribution box 5, out of the pipe 18, into the pipe 20 and thence to the pump 25 which it leaves via the conduit 30 and is passed to the distribution box 4. Controlled additions of strong reagent are now made through the pipe 32 so that the overall strength of the reagent liquid in the trough 1 is increased and normally no overflow of reagent takes place. When the reaction has been completed the trough 1 is drained via the conduit 13, the valve 15 and the conduit 14 into the delivery conduit 24, whilst the pump 25 and distribution boxes 4 and 5 are drained via the pipe 20 and the valve 19 to the delivery conduit 24.

I claim:

1. A method of effecting a non-violent reaction between a solid and a liquid reagent with which said solid would otherwise react violently comprising the steps of locating the solid in a reaction vessel, flooding the reaction vessel with the liquid reagent to at least partially cover the solid with liquid reagent, said liquid reagent being too weak to react violently with said solid, removing liquid reagent from said vessel, adding stronger reagent to said removed reagent at a point remote from said reaction vessel to provide strengthened reagent; introducing said strengthened reagent into said vessel and repeating said steps of removing, adding, and introducing to gradually increase the strength of liquid reagent in contact with said solid in said reaction vessel to effect a non-violent reaction between said solid and said reagent.

2. A method as claimed in claim 1 wherein the reaction vessel is flooded sufficiently to cover the solid completely with liquid reagent.

3. A method as claimed in claim 1 wherein the step of locating the solid in the reaction vessel is effected while the solid is provided with a protective liquid layer.

4. A method as claimed in claim 3 including the step of draining the protective liquid from the solid contained in the reaction vessel prior to the flooding of the reaction vessel with the weak reagent.

5. A method as claimed in claim 1 in which the said weak reagent is selected from the group consisting of inert diluent, diluted reagent and spent reagent.

6. A method as claimed in claim 1 in which the solid located in the reaction vessel is a uranium-zirconium alloy.

7. A method as claimed in claim 6 whereby the liquid reagent added to the dissolution system is a mixture of hydrofluoric acid and hydrogen peroxide.

References Cited by the Examiner

UNITED STATES PATENTS 2,788,008  4/1957  Wanzer _____ 134—101
3,098,707  7/1963  Lewis _____ 23—14.5

OTHER REFERENCES

Perry, Chemical Engineers Handbook, 3rd Edition, (1950), pp. 1203–4.

Reactor Fuel Processing, vol. 3, No. 1, pages 9 and 10. (January 1960.)

LEON D. ROSDOL, *Primary Examiner.*

CARL D. QUARFORTH, *Examiner.*

J. D. VOIGHT, A. G. BOWEN, L. A. SEBASTIAN,
*Assistant Examiners.*